(12) United States Patent
Aoki

(10) Patent No.: US 10,903,004 B2
(45) Date of Patent: Jan. 26, 2021

(54) CAPACITOR AND MANUFACTURING METHOD THEREFOR

(71) Applicant: Murata Manufacturing Co., Ltd., Nagaokakyo (JP)

(72) Inventor: Kensuke Aoki, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 15/872,239

(22) Filed: Jan. 16, 2018

(65) Prior Publication Data

US 2018/0158609 A1    Jun. 7, 2018

Related U.S. Application Data

(63) Continuation of application No. PCT/JP2016/069524, filed on Jun. 30, 2016.

(30) Foreign Application Priority Data

Jul. 23, 2015  (JP) .................................. 2015-145922

(51) Int. Cl.
H01G 4/01    (2006.01)
H01G 4/012   (2006.01)
(Continued)

(52) U.S. Cl.
CPC ............ *H01G 4/06* (2013.01); *H01G 4/01* (2013.01); *H01G 4/012* (2013.01); *H01G 4/085* (2013.01);
(Continued)

(58) Field of Classification Search
CPC ............ H01G 9/25; H01G 9/048; H01G 9/07; H01G 4/012; H01G 9/15; H01G 4/06;
(Continued)

(56) References Cited

U.S. PATENT DOCUMENTS

2002/0075633 A1* 6/2002 Shimada .................. H01G 9/15
361/508
2011/0310530 A1   12/2011 Laor
(Continued)

FOREIGN PATENT DOCUMENTS

JP     2010-177714 A    8/2010
JP     2012-517717 A    8/2012
WO  WO 2015/118901 A    8/2015

OTHER PUBLICATIONS

Fiorentino et al., "Impact of the atomic layer deposition precursors diffusion on solid-state carbon nanotube based supercapacitors performances," Nanotechnology, vol. 26, 2005, pp. 1-11.
(Continued)

*Primary Examiner* — Arun Ramaswamy
(74) *Attorney, Agent, or Firm* — Arent Fox LLP

(57) ABSTRACT

The present invention provides a capacitor including a conductive porous base material with a porous part, a dielectric layer and an upper electrode. The porous part, the dielectric layer, and the upper electrode are stacked on top of one another in this order to define a capacitance formation part. The capacitance format ion part is not present at a lateral end part of the porous part.

26 Claims, 4 Drawing Sheets

(51) Int. Cl.
  *H01G 4/10* (2006.01)
  *H01G 4/06* (2006.01)
  *H01G 4/33* (2006.01)
  *H01G 4/228* (2006.01)
  *H01G 4/08* (2006.01)
  *H01G 9/15* (2006.01)
  *H01G 9/052* (2006.01)
  *H01G 9/08* (2006.01)
  *H01G 9/00* (2006.01)
  *H01G 9/032* (2006.01)
  *H01G 9/07* (2006.01)

(52) U.S. Cl.
  CPC ............ *H01G 4/10* (2013.01); *H01G 4/33* (2013.01); *H01G 9/0032* (2013.01); *H01G 9/032* (2013.01); *H01G 9/052* (2013.01); *H01G 9/0525* (2013.01); *H01G 9/07* (2013.01); *H01G 9/08* (2013.01)

(58) Field of Classification Search
  CPC ............ H01G 4/228; H01G 4/01; H01G 4/10; H01G 4/33
  USPC ........... 361/523, 508, 301.1, 303, 306.1, 311
  See application file for complete search history.

(56) References Cited

U.S. PATENT DOCUMENTS

2012/0200985 A1* 8/2012 Shoji .................. C22C 21/00
                                                                361/523
2016/0329158 A1   11/2016 Hattori et al.

OTHER PUBLICATIONS

International Search Report issued in International Application No. PCT/JP2016/069524, dated Sep. 13, 2016.
Written Opinion of the International Searching Authority issued in International Application No. PCT/JP2016/069524, dated Sep. 13, 2016.

* cited by examiner

CAPACITOR AND MANUFACTURING METHOD THEREFOR

CROSS REFERENCE TO RELATED APPLICATIONS

The present application is a continuation of International application No. PCT/JP2016/069524, filed Jun. 30, 2016, which claims priority to Japanese Patent Application No. 2015-145922, filed Jul. 23, 2015, the entire contents of each of which are incorporated herein by reference.

TECHNICAL FIELD

This invention relates to a capacitor, and a method for manufacturing the capacitor.

BACKGROUND ART

In recent years, with higher-density mounting of electronic devices, capacitors with higher electrostatic capacitance have been required. As such a capacitor, for example, Nanotechnology 26 (2015) 064002 discloses a capacitor that has an Al2O3 layer formed as a dielectric layer and a TiN layer formed as an upper electrode on a porous body composed of a carbon nanotube with the use of an atomic layer deposition method (ALD: Atomic Layer Deposition). Japanese Patent Application Laid-open No. 2010-177714 discloses a solid electrolytic capacitor that has a dielectric oxide film on the surface of a porous sheet body composed of a valve-action metal, a solid electrolyte layer formed on the dielectric oxide film, and a cathode electrode layer further formed thereon.

The capacitor in Nanotechnology 26 (2015) 064002 has the dielectric layer and the upper electrode formed in layers on the porous body. This capacitor has a problem that the layers are likely to cause brittle fracture when bending stress is produced in the manufacturing process or on the substrate. On the other hand, the capacitor in Japanese Patent Application Laid-open No. 2010-177714 will not lead to any short circuit between electrodes even when the dielectric layer is cracked, because the dielectric layer has a self-repair function. However, the electrolytic capacitor of this prior art has polarity, and has another problem of inability to use the capacitor since there is a possibility of causing short circuits in the circuit to which a reverse voltage is applied.

An object of the present invention is to provide a capacitor including a conductive porous base material with a porous part, a dielectric layer located on the porous part, and an upper electrode located on the dielectric layer, where defects are less likely to be caused by crack generation.

BRIEF SUMMARY OF THE INVENTION

The inventor has surprisingly found, as a result of earnestly carrying out studies in order to solve the problems mentioned above, that for a capacitor including a conductive porous base material with a porous part, a dielectric layer located on the porous part, and an upper electrode located on the dielectric layer, an end part of the porous part of the conductive porous base material has no electrostatic capacitance formation part, thereby preventing the capacitor from having defects caused by crack generation.

According to an aspect of the present invention, a capacitor is provided which includes: a conductive porous base material with a porous part; a dielectric layer; and an upper electrode, the porous part, the dielectric layer, and the upper electrode stacked in this order to constitute an electrostatic capacitance formation part, where the electrostatic capacitance formation part is not present at an end part of the porous part of the conductive porous base material.

According to the present invention, the exception of, from the electrostatic capacitance formation part, the end part of the porous part which is likely to serve as a starting point of microcrack generation or breakdown due to concentration of stress can suppress the decrease in breakdown voltage due to crack generation.

MODE FOR CARRYING OUT THE INVENTION

A capacitor according to the present invention will be described in detail below with reference to the drawings. However, the invention is not limited to the shapes and arrangement of respective constructional elements shown in the figures.

Figure 1:
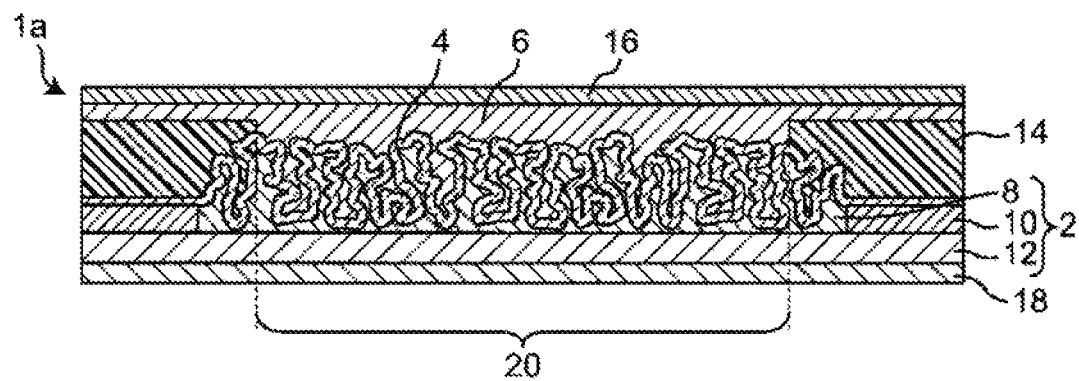
FIG. 1 is a schematic cross-sectional view of a capacitor 1a according to an embodiment of the present invention.
Figure 2:
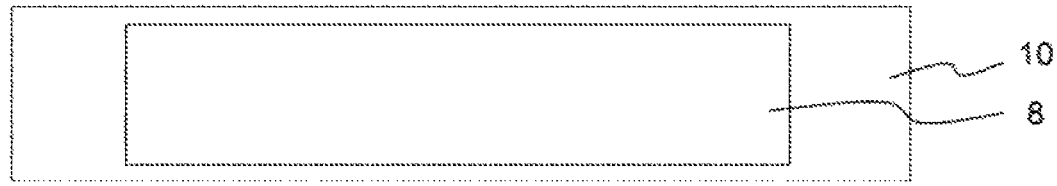
FIG. 2 is a schematic plan view of a conductive metal substrate of the capacitor 1a in FIG. 1.
Figure 3:
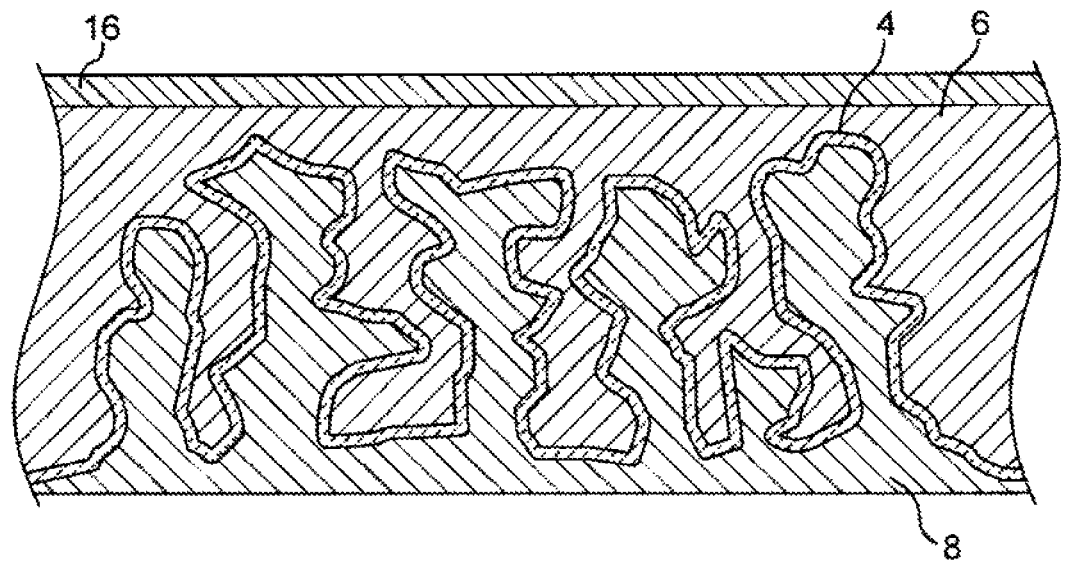
FIG. 3 is an enlarged view of a central part of a high-porosity part of the capacitor 1a in FIG. 1.
Figure 4:
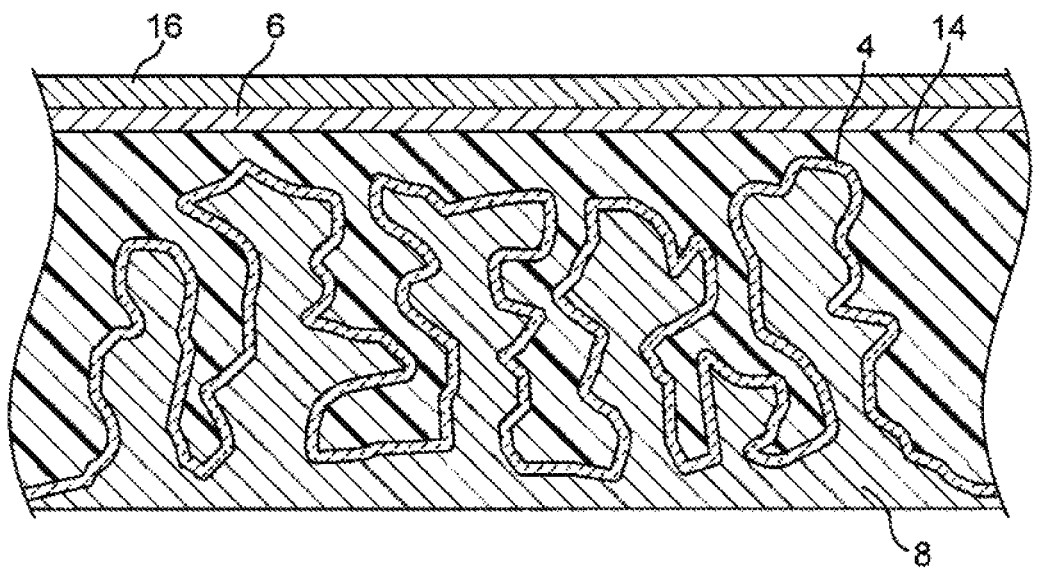
FIG. 4 is an enlarged view of an end part of the high-porosity part of the capacitor 1a in FIG. 1.

FIG. 1 shows a schematic cross-sectional view of a capacitor 1a according to a first embodiment of the present invention, FIG. 2 shows a schematic plan view of a conductive porous base material 2. FIG. 3 shows a schematic enlarged view of a central part of a high-porosity part 8 of the conductive porous base material 2. FIG. 4 shows a schematic enlarged view of an end part thereof.

As shown in FIGS. 1 to 4, the capacitor 1a according to the present embodiment has a substantially cuboid shape and schematically includes a conductive porous base material 2, a dielectric layer 4 formed on the conductive porous base material 2 and an upper electrode 6 formed on the dielectric layer 4. The conductive porous base material 2 has an upper or first principal surface on which the dielectric layer is formed. The first principal surface includes a central high-porosity part 8 and laterally outward low-porosity parts 10 (which are lower in porosity than the porous part). More specifically, the low-porosity parts 10 surround the high-porosity part 8 as best shown in FIG. 2. The conductive porous base material 2 also includes a supporting part 12 defining a second (bottom) principal surface of the conductive porous base material 2. More specifically, the upper surfaces oi the high-porosity part 8 and the low-porosity part 10 together constitute the first surface of the conductive porous base material 2 and the bottom surface of the supporting part 12 constitutes the second surface of the conductive porous base material 2. The porous part 8, dielectric layer 4 and upper electrode 6 of the conductive porous base material 2 are stacked in this order to form an electrostatic capacitance formation part 20 of a capacitor. An insulating part 14 is located at a terminal part of the capacitor 1*a* and around the outer edges (the end part) of the high-porosity part 8 and fills pores of the high-porosity part in the location of the insulating part. Accordingly, the insulating part 14 is present between the dielectric layer 4 and the upper electrode layer 6 at those locations with the result that the electrostatic capacitance formation part 20 does not extend to the lateral outward end part of the high-porosity part 8.

The capacitor 1*a* further includes a first external electrode 16 located on the upper electrode 6 and a second external electrode 18 located on the second principal surface of the conductive porous base material 2. In the capacitor 1*a* according to the present embodiment, the first external electrode 16 is electrically connected to the upper electrode 6 and the second external electrode 18 is electrically connected to the conductive porous base material 2.

As noted above, the conductive porous base material 2 has a porous structure, the material and configuration of which are not limited other than it is porous and has a conductive surface. Examples of materials which can foe used for the conductive porous base material include porous metal base materials, or base materials that have a conductive layer formed on the surface of a porous silica material, a porous carbon material, or a porous ceramic sintered body. In accordance with a preferred aspect, the conductive porous base material is a porous metal base material.

Examples of the metal which can be used for the porous metal base material include aluminum, tantalum, nickel, copper, titanium, niobium, and iron, and alloys such as stainless steel and duralumin. Preferably, the conductive metal base material is an aluminum porous base material.

In this specification, the term "porosity" refers to the proportion of voids in the porous part. The porosity can be measured in the following way.

A sample for TEM (Transmission Electron Microscope) observation of the porous part is prepared by an FIB (Focused Ion Beam) micro-sampling method. A cross section of the sample is observed at approximately 50,000-fold magnification, and subjected to measurement by STEM (Scanning Transmission Electron Microscopy)-EDS (Energy Dispersive X-ray Spectrometry) mapping analysis. The ratio of an area without any base material present in the mapping measurement field is regarded as the porosity.

The high-porosity part 8 has a porous structure which increases the specific surface area of the conductive porous base material, thereby further increasing the electrostatic capacitance of the capacitor.

The porosity in the high-porosity part mentioned above can be preferably 20% or more, more preferably 30% or more, further preferably 50% or more, and more preferably 60% or more. The increased porosity can further increase the electrostatic capacitance of the capacitor. In addition, from the perspective of increasing the mechanical strength, the porosity of the high-porosity part can be preferably 90% or less, more preferably 80% or less.

The high-porosity part mentioned above is not particularly limited, but preferably has an expanded surface ratio of 30 times or more and 10,000 times or less, more preferably 50 times or more to 5,000 times or less, for example, 300 times or more and 600 times or less. In this regard, the expanded surface ratio refers to the surface area per unit projected area. The surface area per unit projected area can be obtained from the amount of nitrogen adsorption at a liquid nitrogen temperature with the use of a BET specific surface area measurement system.

In addition, the expanded surface ratio can be also obtained by the following method. An STEM (Scanning Transmission Electron Microscope) image of a cross section (a cross section obtained by cutting in the thickness direction) of a sample is taken entirely in the direction of the thickness (height) T with a width X (multiple images may be combined when it is not possible to take the image once). The total path length L of pore surfaces (total length of the pore surfaces) is measured in the obtained cross section with the width X and the height T. In this regard, the total path length of the pore surfaces is LX in a square prism region including the above-mentioned cross section with the width X and the height T as a side surface and the porous base material surface as a bottom surface. In addition, the area of the base of the square prism is X2. Accordingly, the expanded surface ratio can be obtained as LX/X2=L/X.

The thickness of the high-porosity part mentioned above is not particularly limited, but can be selected appropriately for any purpose, and may be, for example, 10 μm or more and 1000 μm or less, preferably 30 μm or more, and 300 μm or less, preferably 150 μm or less, more preferably 80 μm or less, and further preferably 40 μm or less.

The low-porosity part 10 mentioned above refers to a region that is lower in porosity than the high-porosity part 8. It is to be noted that there is no need for the low-porosity part to have any pore. The porosity of the low-porosity part is, from the perspective of increasing the mechanical strength, preferably a porosity that is 60% or less of the porosity of the high-porosity part, and more preferably a porosity that is 50% or less of the porosity of the high-porosity part. For example, the porosity of the low-porosity part is preferably 20% or less, and more preferably 10% or less. In addition, the low-porosity part may have a porosity of 0%. The low-porosity part makes a contribution to an improvement in the mechanical strength of the capacitor.

Methods for forming the low-porosity part mentioned above include, for example, filling some pores of the porous part by melting the metal through laser irradiation or the like, or filling some pores of the porous part by compression through die machining or press working. Examples of the laser type include, fiber lasers, CO2 layers, YAG lasers, YVO layers, and excimer lasers, and the use of a femtosecond laser, a picosecond laser, or a nanosecond laser for short-pulse irradiation is preferred because it is possible to achieve more precise control.

The porosity of the supporting part 12 of the conductive porous base material is preferably smaller in order to fulfill the function as a support, specifically preferably 10% or less, and more preferably, there is substantially no void.

The thickness of the supporting part 12 is not particularly limited, but in order to increase the mechanical strength of the capacitor, is preferably 10 μm or more, and can be, for example, 100 μm or more or 500 μm or more. In addition, from the perspective of achieving a lower-profile capacitor, the thickness is preferably 1000 μm or less, and can be, for example, 500 μm or less, preferably 100 μm or less, more preferably 50 μm or less, further preferably 30 μm or less.

It is to be noted that according to the present embodiment, the conductive porous base material has the high-porosity part at one principal surface and the low-porosity part present around lateral edges of the high-porosity part, but the present invention is not limited thereto. More specifically, the locations, disposition numbers, sizes, shapes of high-porosity parts and low-porosity parts, the ratio between the both parts, and the like are not particularly limited. In addition, there is no need for the high-porosity part and the low-porosity part to be uniform in thickness. Indeed, the low-porosity part is not an essential element and can be omitted such that the first principal surface of the conductive porous base material is composed of only a high-porosity part. In addition, the electrostatic capacitance of the capacitor can be controlled by adjusting the ratio between the high-porosity part and the low-porosity part. Furthermore, both the first and second principal surfaces of the conductive porous base material may have high-porosity parts.

The method for manufacturing the conductive porous base material 2 mentioned above is not particularly limited. For example, when the conductive porous base material is a porous metal base material, the conductive porous base material can be manufactured by processing an appropriate metal material in accordance with a method for forming a porous structure, a method for filling a porous structure, or a method for removing a porous structure part, or a combined method thereof.

The metal material for the manufacture of the porous metal base material can be a porous metal material (for example, etched foil) or a metal material that has no porous structure (for example metal foil), or a combined material thereof. The method for the combination is not particularly limited, but examples thereof include, for example, bonding the materials by welding or with an electrically conductive adhesive material or the like.

Methods for forming the porous structure include, but not limited thereto, for example, an etching process.

Methods for filling the porous structure include, but are not limited to, filling pores by melting a metal through laser irradiation or the like, or filling pores by compression through die machining or press working. The lasers that can be used are not particularly limited, but a CO2 layer, a YAG laser, an excimer laser, and all-solid-state pulsed lasers such as a femtosecond laser, a picosecond laser, and a nanosecond laser. All-solid-state pulsed lasers such as a femtosecond laser, a picosecond laser, and a nanosecond laser are preferred, because the shape and the porosity can be controlled with more precision.

Methods for removing the porous structure part include, but are not limited to, processing with a dicer and laser ablation processing. Lasers preferred for the laser abrasion process include all-solid-state pulsed lasers such as a femtosecond laser, a picosecond laser, and a nanosecond laser. The use of these lasers can control the shape and the porosity with greater precision.

In accordance with another method, the conductive porous base material 2 can be manufactured by forming a conductive layer on the surface of a porous material, for example, a porous silica material, a porous carbon material, or a porous ceramic sintered body.

In the capacitor 1a according to the present embodiment, the dielectric layer 4 is formed on both the high-porosity part 8 and the low-porosity part 10.

The material that forms the dielectric layer 4 is not particularly limited as long as the material has an insulating property. For example, metal oxides such as AlOx (e.g., Al2O3), SiOx (e.g., SiO2), AlTiOx, SiTiOx, HfOx, TaOx, ZrOx, HfSiOx, ZrSiOx, TiZrOx, TiSrWOx, TiOx, SrTiOx, PbTiOx, BaTiOx, BaSrTiOx, BaCaTiOx, and SiAlOx; metal nitrides such as AlNx, SiNx, and AlScNx; or metal oxynitrides such as AlOxNy, SiOxNy, HfSiOxNy, and SiCxOyNz, and AlOx, SiOx, SiOxNy, and HfSiOx may be used. It is to be noted that the formulas mentioned above are merely intended to represent possible constitutions of the materials, but not intended to limit the compositions. More specifically, the x, y, and z attached to O and N may have any value larger than 0, and the respective elements including the metal elements may have any presence proportion.

The thickness of the dielectric layer is not particularly limited, but for example, is preferably between 5 nm and 100 nm and, more preferably between 10 nm and 50 nm. A dielectric layer which is 5 nm or more in thickness can increase the insulating property and thus allows leakage current to be reduced. In addition, a dielectric layer of not more than 100 nm in thickness makes it possible to achieve higher electrostatic capacitance.

The dielectric layer mentioned above is preferably formed using a gas-phase method (dry process), for example, a vacuum vapor deposition method, a chemical vapor deposition (CVD: Chemical Vapor Deposition) method, a sputtering method, an atomic layer deposition (ALD: Atomic Layer Deposition) method, a pulsed laser deposition (PLD: Pulsed Laser Deposition) method, or the like. The ALD method is preferred, because it can form a more homogeneous and denser film even in microscopic regions of pores of porous members.

In the capacitor 1a according to the present embodiment, the insulating part 14 is provided on the lateral outward end part of the conductive porous base material 2, such that a part of the insulating part 14 covers the laterally outward end part of the high-porosity part 8 as well as the low-porosity part 10. The insulating part, as shown in FIG. 4, is provided to preferably fill (or penetrate) pores of the laterally outward end parts of the high-porosity porous part 8.

The "end part" of the conductive porous base material 2 is preferably a region of the conductive porous base material 2 within a certain distance (for example, 10 μm, 50 μm, 100 μm, 300 μm, or 500 μm) from the laterally outward end of the conductive porous base material 2. The "end part" of the high-porosity part 8 of the conductive porous base material 2 is preferably a region of the high-porosity part 8 within a certain distance (for example, 5 μm, 10 μm, 30 μm, 50 μm, 100 μm, 300 μm, or 500 μm) from the laterally outward end of the high-porosity part 8.

The insulating part 14 is preferably formed so as to cover both the high-porosity part 8 and the low-porosity part 10, and the lower limit of the covering distance of the lateral edges of the high-porosity part 8 is preferably 5 μm, more preferably 10 μm and further preferably 20 μm. The upper limit of the covering distance can be preferably 50 μm, more preferably 40 μm, and further preferably 30 μm. For example, the covering distance of the insulating part can be 5 μm or more and 50 μm or less, 10 μm or more and 40 μm or less, or 20 μm or more and 30 μm or less.

In accordance with an aspect of the invention, the ratio of the covering distance to the thickness of the high-porosity part 8 can be preferably 0.125 or more and 1.25 or less, and more preferably 0.250 or more and 1.00 or less.

Figure 5:
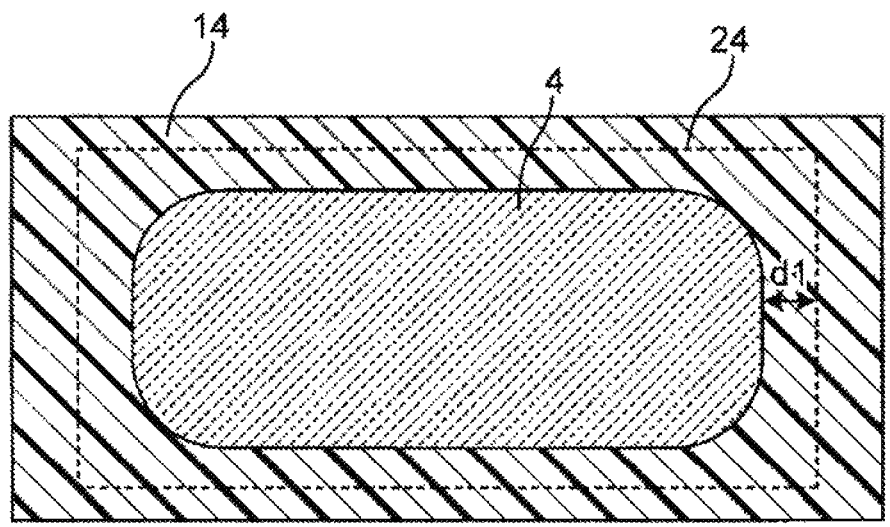
FIG. 5 is a diagram for explaining a site for measuring the covering distance of an insulating part on a high-porosity part.

In this regard, the "covering distance" of the insulating part refers to the width of the insulating part covering outer lateral ends of the high-porosity part 8. This is the distance from an end of the high-porosity part 8 to an end of the insulating part 14. For example, the covering distance refers to a covering distance d1 at a central part of a side of the high-porosity part, when the high-porosity part has a plainer shape with corners as shown in FIG. 5 (for example, a rectangular shape as indicated by a boundary 24 in FIG. 5). In addition, when the high-porosity part has a planar shape without any corners, the covering distance refers to a covering distance at a site of the planar shape with the largest curvature (for example, at any site in the case of a circular shape, or at a the intersection between the minor axis and the circumference in the case of an ellipse).

The insulating part 14 is disposed at the laterally outer end part of the conductive porous base material 2, thereby making it possible to prevent end surface discharge between the upper electrode 6 disposed thereon and the conductive porous base material 2.

In addition, the insulating part 14 is formed so as to cover the end part of the high-porosity part of the conductive porous base material, thereby spacing the high-porosity part 8 (or the dielectric layer 4) from the upper electrode 6 by a significant amount as shown in FIG. 4, and thus, this portion does not substantially contribute to the electrostatic capacitance formation part 20 of the capacitor. This configuration improves the strength of the end part of the high-porosity part 8, thereby allowing crack generation to be suppressed. Furthermore, even when the dielectric layer is cracked at the laterally outward end part of the high-porosity part, short circuits are less likely to occur because of the presence of the insulating part 14 between the conductive porous base material 2 and the upper electrode 6, thereby allowing the decrease in breakdown voltage to be suppressed.

The material that forms the insulating part 14 is not particularly limited as long as the material has an insulating property. However, it is preferably to use a heat-resistant material in the case of subsequently using an atomic layer deposition method. Various types of glass materials, for example, liquid glass, ceramic materials, polyimide materials, and fluorine resins are preferred as an insulating material that forms the insulating part 14.

The material that forms the insulating part preferably has a viscosity of preferably 150 Pa·s (E-type viscometer at 25° C.) or lower, more preferably 120 Pa·s or lower, further preferably 100 Pa·s or lower, for facilitating the penetration into the end part of the high-porosity part.

The thickness of the insulating part 14 at the low-porosity part 10 is not particularly limited, but from the perspective of preventing end surface discharge in a more reliable manner, the thickness is preferably 1 μm or more, and can be, for example, 5 μm or more or 10 μm or more. In addition, from the perspective of achieving a lower-profile capacitor, the thickness is preferably 100 μm or less, and can be, for example, 50 μm or less, or 20 μm or less.

In the capacitor 1a according to the present embodiment, the upper electrode 6 is formed on both the dielectric layer 4 and the insulating part 14. The material constituting the upper electrode 6 is not particularly limited as long as the material has a conductive property. Examples of conductive materials that can be used include Ni, Cu, Al, W, Ti, Ag, Au, Pt, Zn, Sn, Pb, Fe, Cr, Mo, Ru, Pd, and Ta and alloys thereof, e.g., CuNi, AuNi, AnSn, and metal nitrides and metal oxynitrides such as TiN, TiAlN, TiON, TiAlON, TaN, and Ni, Cu, Ru TiN, and TiON are preferred.

The thickness of the upper electrode is not particularly limited, but for example, preferably 3 nm or more, more preferably 10 nm or more. The upper electrode of 3 nm or more in thickness can reduce the resistance of the upper electrode itself.

The upper electrode may be formed by an ALD method. The use of the ALD method can further increase the electrostatic capacitance of the capacitor. The upper electrode may, by way of example, be formed by using other methods such as a chemical vapor deposition (CVD: Chemical Vapor Deposition) method, plating, bias sputtering, a Sol-Gel method, or electrically conductive polymer filling, which can coat the dielectric layer, and substantially fill pores of the porous metal base material. Preferably, a conductive film may be formed by the ALD method on the dielectric layer, and pores may be filled thereon by other approach, with a conductive substance, preferably a substance that is lower in electrical resistance, thereby forming the upper electrode. This constitution can efficiently achieve a higher electrostatic capacitance density and a low equivalent series resistance (ESR: Equivalent Series Resistance).

It is to be noted that when the upper electrode fails to have sufficient conductivity as a capacitor electrode after the formation of the upper electrode, an electrode layer of Al, Cu, Na, or the like may be additionally formed on the surface of the upper electrode by a method such as sputtering, vapor deposition, or plating.

According to the present embodiment, the first external electrode 16 is formed on the upper electrode 6 and the second external electrode 18 formed on the lower principal surface of the conductive porous base material 2 (as viewed in FIG. 1) at the supporting part 12 thereof.

The materials used for the first and second external electrodes 16 and 18 are not particularly limited and include, but are not limited to, Au, Pb, Pd, Ag, Sn, Ni, and Cu, and alloys thereof, and electrically conductive polymers. The method for forming the wiring electrodes is not particularly limited, but for example, a CVD method, electrolytic plating, electroless plating, vapor deposition, sputtering, conductive paste baking, and the like can be used, and electrolytic plating, electroless plating, vapor deposition, sputtering, and the like are preferred.

It is to be noted that in this embodiment the first and second external electrodes 16 and 18 are disposed on the entire upper and lower surfaces of the capacitor. However, the invention is not so limited and the electrodes can be disposed on only a part of the respective surfaces and in any shape and size. In addition, the first and second external electrodes 16 and 18 are not essential elements, and may be omitted. In such a case, the upper electrode 6 also functions as a first external electrode and the supporting part 12 functions as a second external electrode. More specifically, the upper electrode 6 and the supporting part 12 may function as a pair of electrodes. In this case, the upper electrode 6 may function as an anode and the supporting part 12 may function as a cathode. Alternatively, the upper electrode 6 may function as a cathode, whereas the supporting part 12 may function as an anode.

While the capacitor 1a according to the present embodiment has been described above, various modifications can be made to the capacitor according to the present invention as long as there is substantially no electrostatic capacitance formation part at the end part of the porous part (the high-porosity part according to the embodiment mentioned above).

According to the foregoing embodiment, the insulating part 14 covers both the low-porosity part 10 and part of the high-porosity part 8. However, the invention is not so limited. Additionally, the upper electrode 6 may not cover the laterally outward end part of the high-porosity part 8. More specifically, the upper electrode 6 may be present only at the electrostatic capacitance formation part 20 and not over the insulating resin 14. The upper electrode 6 is not formed at the end part of the porous part, thereby forming no electrostatic capacitance formation part that has a stacked structure of porous part dielectric layer upper electrode at the end part of the porous part. This configuration causes no breakdown, because of the absence of the upper electrode 6, even when the end part of the high-porosity part 8 is cracked.

Figure 6:
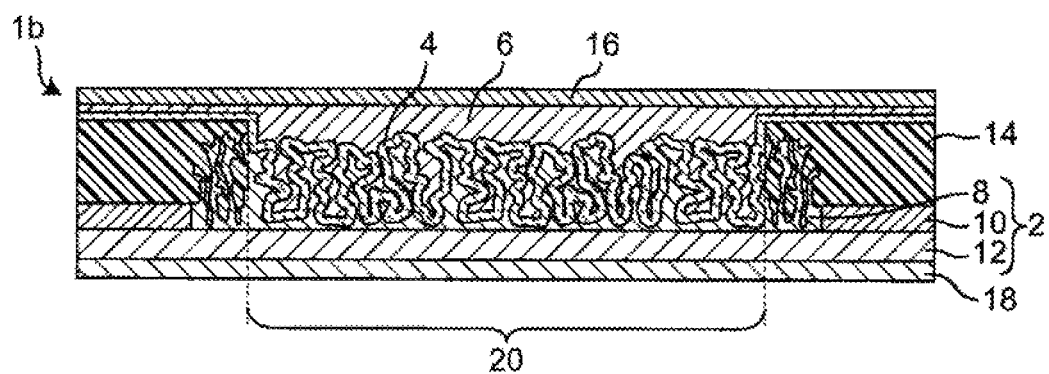
FIG. 6 is a schematic cross-sectional view of a capacitor 1b according to another embodiment of the present invention.
Figure 7:
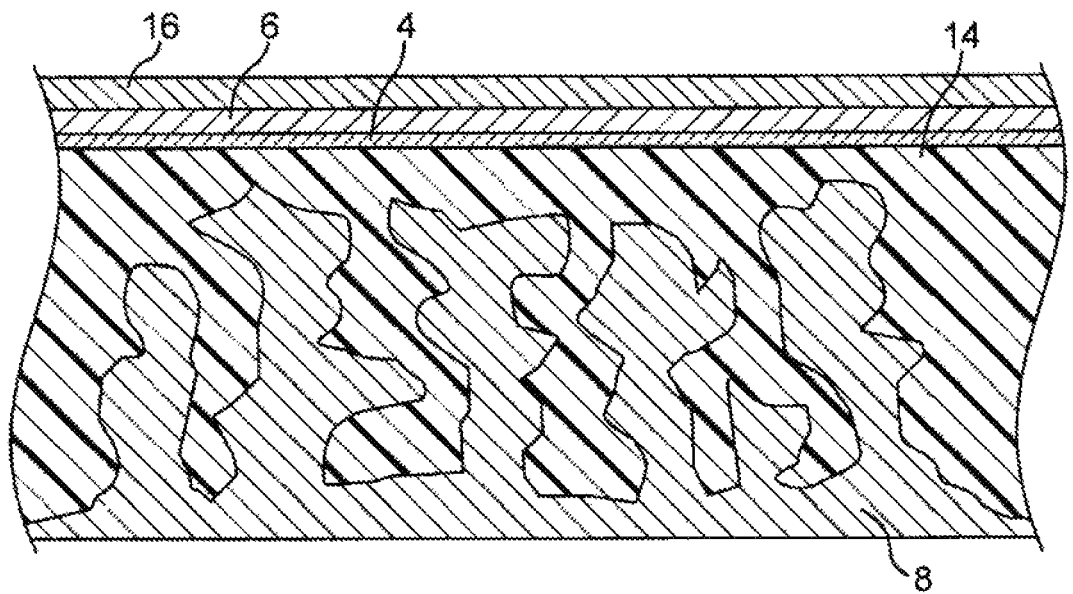
FIG. 7 is an enlarged view of an end part of a high-porosity part of the capacitor 1b in FIG. 6.

In accordance with another aspect, the capacitor according to the present invention may be a capacitor 1b as shown in FIG. 6. In accordance with this embodiment, an insulating part 14 is provided between the conductive porous base material 2 and the dielectric layer 4. That is, the dielectric layer 4 is formed on top of the insulating part 14. That is best shown in FIG. 7. In this structure the pores of the laterally outer end part of the highly porous part 8 are filled with the material of the insulating part 14, and the dielectric layer 4, the upper electrode 6, and a first external electrode 16 are formed on top of the insulating part 14. Accordingly, at the laterally outer end part of the highly-porous part 8, the conductive porous base material 2 is spaced from the upper electrode 6 by a large amount, and thus, this portion does not substantially function as (does not substantially contribute to) the electrostatic capacitance formation part 20 of the capacitor. This configuration improves the strength of the end part of the high-porosity part, thereby allowing crack generation to be suppressed, and furthermore, even when the end part of the high-porosity part is cracked, makes short circuits less likely to be caused because of the presence of the insulating part 14 between the conductive porous base material 2 and the upper electrode 6, thereby allowing the decrease in breakdown voltage to be suppressed.

Figure 8:
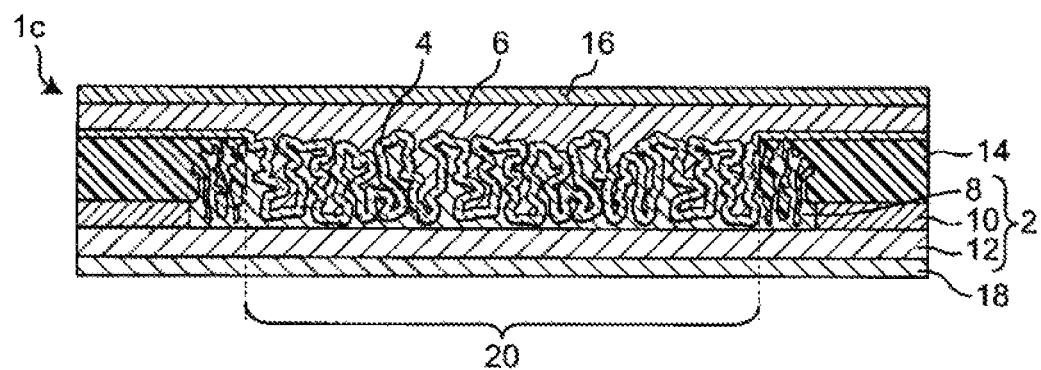
FIG. 8 is a schematic cross-sectional view of a capacitor 1c according to another embodiment of the present invention.
Figure 9:
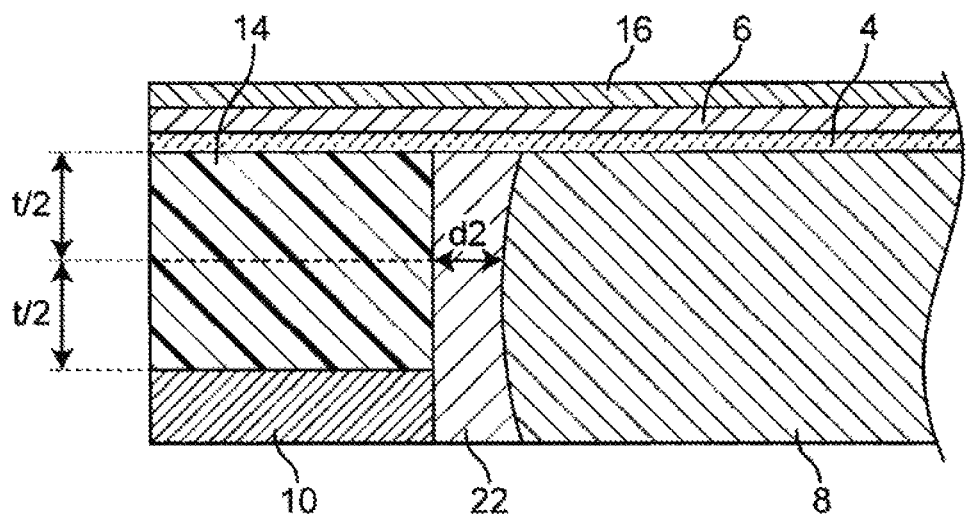
FIG. 9 is a diagram for explaining a site for measuring the penetration distance of an insulating part into a high-porosity part.

In accordance with another embodiment, the capacitor according to the present invention may be a capacitor 1c as shown in FIG. 8. In accordance with this embodiment, the insulating part 14 does not cover highly porous part 8, but penetrates into an end part 22 (FIG. 9) of the high-porosity part 6 from a side surface of the porous part or a low-porosity part, thereby filling pores of the pore part. Accordingly, at the end part, of the high-porosity part 8, the conductive porous base material 2 is spaced by a large distance from the upper electrode 6. As a result, this portion does not substantially function as (does not substantially contribute to) the electrostatic capacitance formation part 20 of the capacitor. This configuration improves the strength of the end part of the high-porosity part, thereby allowing crack generation to be suppressed, and furthermore, even when the end part of the high-porosity part is cracked, makes short circuits less likely to be caused, because of the presence of the insulating part 14 between the conductive porous base material 2 and the upper electrode 6, thereby allowing the decrease in breakdown voltage to be suppressed.

The lower limit of the penetration distance of the insulating part 14 into the high-porosity part 8 can be preferably 2 μm, more preferably 5 μm, and further preferably 8 μm, whereas the upper limit thereof can be preferably 14 μm, more preferably 10 μm. For example, the penetration distance of the insulating part can be 2 μm or more and 14 μm or less, or 5 μm or more and 10 μm or less.

The "penetration distance" of the insulating part 14 into the high-porosity part 8 refers to a penetration distance d2 (FIG. 9) at the location of ½ the thickness t of the insulating part in contact with the porous part. The penetration distance can be measured by observing a cross section of the sample with the use of an electron microscope, for example, EDS (Energy Dispersive X-ray Spectroscopy).

In accordance with this embodiment, the upper surface of the insulating part 14 and the upper surface of the porous part are located on the same level (on the same plane), but the invention is not so limited. The insulating part may cover the end part of the porous part as in the capacitor 1b.

In accordance with the embodiments described above, the capacitors 1a to 1c each have a substantially cuboid shape, but the present invention is not so limited. The capacitor according to the present invention can be made into any shape, and for example, the planar shape may be a circular shape, an elliptical shape, a quadrangular shape with round corners, and the like.

In accordance with an aspect, the respective layers may have a buffer layer or the like for enhancing the adhesion between the layers, or for preventing the diffusion of constituents between the respective layers. In addition, the capacitor may have a protective layer on a side surface or the like.

In accordance with a preferred embodiment, of the present invention the conductive porous base material includes a supporting part, the porous part formed on the supporting part, and a low-porosity part formed on the supporting part and around the porous part, there is an insulating part on the low-porosity part, the insulating part is present even on the end part of the porous part, or penetrates into the end part of the porous part, and the upper electrode is not present between the conductive porous base material and the insulating part.

EXAMPLES

Example 1

Figure 10:
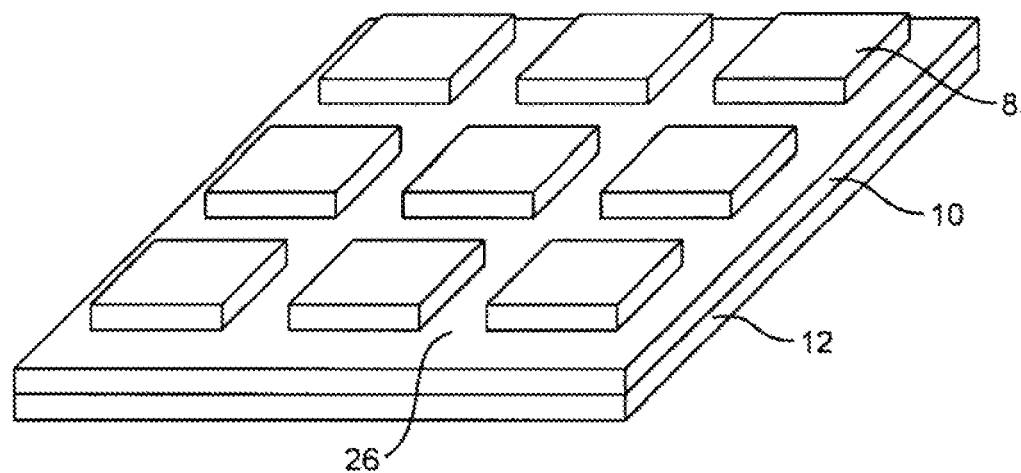
FIG. 10 is a schematic perspective view of a conductive porous substrate with a low-porosity part formed according to an example.

As a conductive substrate, aluminum etched foil for aluminum electrolytic capacitors, with a thickness of 100 μm and an expanded surface ratio of approximately 200 times, was prepared, with a porous metal layer 40 μm in thickness formed only on one side of the foil. The aluminum etched foil was processed with the use of a nanosecond pulsed fiber laser system, thereby partially melting a portion of the porous part to fill pores, and thus forming a groove 26 between the high-porosity parts 8 (the low-porosity part 10). The obtained foil has high-porosity parts 8 which are 0.35 mm on a side and arranged in a grid-like form. The low-porosity parts 10 surrounding the circumferences of the high-porosity parts (FIG. 10).

Next, the groove was filled with a polyimide resin of 60 Pa·s in viscosity (E-type viscometer at 25° C.) with the use of an air-type dispenser. The dispenser was 0.2 mm in nozzle diameter and the nozzle center was set in a location 0.2 mm away from an end of the high-porosity part. The resin filling was carried out such that the covering distance on the porous part was 20 μm. Immediately after application, temporary drying with a hot plate was carried out and a heat treatment with an oven was then carried out, thereby forming an insulating part.

Next, an SiOx film of 40 nm was formed entirely over the substrate with the use of an atomic layer deposition method, thereby forming a dielectric layer. Then, a TiN film was formed entirely over the substrate with the use of an atomic layer deposition method, thereby forming an upper electrode.

Next, the entire substrate was plated with Cu by an electroless plating method, thereby forming a first external electrode and a second external electrode.

The central part of the groove (the insulating part 10) was cut with the use of a nanosecond laser system or fiber laser system, thereby achieving the division into individual capacitors as shown in FIG. 6.

Three capacitors were drawn from the thus prepared capacitors, and the samples were surrounded with a resin, with the capacitors set up vertically. Next, polishing was carried out to a location at approximately ½ of the capacitor in the width direction thereof by carrying out the polishing with a polishing machine, thereby exposing cross sections of end parts of the high-porosity parts. The obtained cross sections were subjected to a mapping analysis on carbon distribution by a SEM/EDS (Scanning Electron Microscope/Energy Dispersive X-ray Spectroscopy) analysis method, thereby measuring the penetration distances at the locations of ½ the thicknesses t of the insulating parts in contact with the porous parts (d2 in FIG. 9). Among the measurements made for the three samples, the penetration distance of the polyimide resin of the insulating part into the high-porosity part was 5 µm at the minimum. It is to be noted that S-4800 (from Hitachi High-Technologies Corporation) was used for the SEM, whereas EMAX (from Horiba, Ltd.) was used for the EDS.

Comparative Example 1

A capacitor according to Comparative Example 1 was obtained in the same way as in Example 1, except for the use of a polyimide resin of 180 Pa·s in viscosity (E-type viscometer at 25° C.) as a material for the insulating part and the formation of the insulating part without it covering any part of the high-porosity part. As a result of analyzing a cross section of the capacitor according to Comparative Example 1 by EDS, the penetration of the insulating part into the high-porosity part, was not observed.

Example 2

A capacitor according to Example 2 was obtained in the same way as in Example 1, except that the air-type dispenser was adjusted to 0.35 mm in nozzle diameter, and that the covering distance on the high-porosity part was adjusted to 50 µm. As a result or analyzing a cross section of the capacitor according to Example 2 by EDS, the penetration distance of the insulating part into the high-porosity part was 20 µm.

Example 3

A capacitor according to Example 3 was obtained in the same way as in Example 1, except that the nozzle center of the air-type dispenser was located at 0.25 mm from an end of the high-porosity part, and that the covering distance on the high-porosity part was adjusted to 5 µm. As a result, of analyzing a cross section of the capacitor according to Example 3 by EDS, the penetration distance of the insulating part into the high-porosity part was 2 µm.

Example 4

A capacitor according to Example 4 was obtained in the same way as in Example 1, except for the use of aluminum etched foil with a porous part of 30 µm in thickness, and furthermore, retention for 5 minutes after filling the groove with the polyimide resin, and then temporary drying with a hot plate, thereby adjusting the covering distance into the high-porosity part to 18 µm. As a result of analyzing a cross section of the capacitor according to Example 4 by EDS, the penetration distance of the insulating part into the high-porosity part was 7 µm.

Example 5

A capacitor according to Example 5 was obtained in the same way as in Example 1, except for the use of a spin-on-glass material instead of the polyimide resin. The covering distance on the high-porosity part was 5 µm, and the penetration distance into the high-porosity part was 9 µm.

Test Example

For the capacitors obtained according to Examples 1 to 4 and Comparative Example 1, the ratios of capacitors with a breakdown voltage of 10 V or higher (capacitors where the current values were less than 1 mA when a direct-current voltage of 10 V was applied to the capacitors were determined to have a breakdown voltage of 10 V or higher) were evaluated as non-defective product ratios. Evaluated were 120 capacitors according to each of Example 1 and Comparative Example 1 and 50 capacitors according to each of Examples 2 to 4.

TABLE 1

| | Covering Distance | Penetration Distance | Thickness of Porous Part | Ratio of Covering Distance/Porous Part Thickness | Ratio of Penetration Distance/Porous Part Thickness | Non-Defective Product Ratio | Electrostatic Capacitance | |
|---|---|---|---|---|---|---|---|---|
| | | | | | | | Absolute Value | Ratio to Example 1 |
| Example 1 | 20 µm | 5 µm | 40 µm | 0.5 | 0.125 | 65.8% | 58 pF | — |
| Example 2 | 50 µm | 14 µm | 40 µm | 1.25 | 0.35 | 65.0% | 28 pF | 0.48 |
| Example 3 | 5 µm | 2 µm | 40 µm | 0.125 | 0.05 | 72.5% | 69 pF | 1.19 |
| Example 4 | 18 µm | 7 µm | 30 µm | 0.6 | 0.23 | 70.0% | 61 pF | 1.05 |
| Comparative Example 1 | 0 µm | 0 µm | 40 µm | 0 | 0 | 4.2% | 71 pF | 1.22 |

From the foregoing results, it has been confirmed that the capacitors according to the present invention wherein the insulating parts cover or penetrate a portion of the high-porosity parts, result in non-defective product ratios which are much greater than capacitors according to Comparative Example 1 wherein the insulating layer does not cover or penetrate the high-porosity part. The analysis of the capacitors regarded as defectives has confirmed that the short-circuited spots are located at the end parts of the porous parts, on which stress is likely to be concentrated. Accordingly, the capacitors according to the present invention are considered as capacitors with crack generation suppressed by reinforcing the end parts of the porous parts with the insulating materials, and not considered directly into short circuits because of the presence of the insulating parts between the upper electrodes and the porous parts, even when the end parts of the porous parts are cracked.

The capacitor according to the present invention is highly reliable, and less likely to cause breakdown, and thus used for various electronic devices in a preferred manner. The capacitor according to the present invention, which is typically mounted onto a substrate, can be used as an electronic component.

DESCRIPTION OF REFERENCE SYMBOLS 1a-1c: capacitor
2: conductive porous base material
4: dielectric layer
6: upper electrode
8: high-porosity part (porous part)
10: low-porosity part
12: supporting part
14; insulating part
16: first external electrode
18: second external electrode
20: electrostatic capacitance formation part
22: end part
24: boundary

The invention claimed is:

1. A capacitor, comprising:
(A) a supporting layer;
(h) a conductive porous base material including a central portion having a first porosity and a peripheral portion having a second porosity which is lower than the first porosity;
(c) a dielectric layer located on the central portion of the conductive porous base material;
(d) an insulating layer located on the peripheral portion of the conductive porous base material and extending onto an outer peripheral area of the central portion; and
(e) an upper electrode located on and in direct contact with the dielectric layer, the conductive porous base material, at least a portion of the dielectric layer the upper electrode cooperating to form an electrostatic capacitive part;
wherein:
the dielectric layer is not located between the peripheral portion of the conductive porous base material and the insulating layer; and
the insulating layer is located between the upper electrode and the outer peripheral area of the central portion of the conductive porous base material.

2. The capacitor according to claim 1, wherein the gas-phase method is an atomic layer deposition method.

3. The capacitor according to claim 1, wherein a thickness of the dielectric layer is 50 nm or less.

4. The capacitor according to claim 1, wherein the upper electrode comprises a metal, a metal nitride, or a metal oxynitride.

5. The capacitor according to claim 1, wherein the insulating layer extends into the outer peripheral area of the central portion by a distance of 2 µm or more and 14 µm or less from an outer peripheral end of the central portion of the conductive porous base material.

6. The capacitor according to claim 1, wherein the central portion has an outward lateral edge and the peripheral portion extends outwardly from the outward lateral edge.

7. The capacitor according to claim 6, wherein the peripheral portion extends around the entire outward lateral edge of the central portion.

8. The capacitor according to claim 7, wherein the central portion has pores and the insulating layer extends into the pores of the central portion which are located adjacent to the peripheral portion.

9. The capacitor according to claim 1, wherein the outer peripheral area of the central portion has pores and the insulating layer extends into the pores of the outer peripheral area of central portion.

10. The capacitor according to claim 1, wherein the dielectric layer extends into pores in the central portion of the conductive porous base material.

11. The capacitor according to claim 1, wherein an outer periphery of the electrostatic capacitive part ends at the insulating layer.

12. The capacitor according to claim 1, wherein the insulating layer extends into pores located in the outer peripheral area of the central portion of the conductive porous base material.

13. A capacitor, comprising:
(a) a supporting layer;
(b) a conductive porous base material including a central portion having a first porosity and a peripheral portion having a second porosity which is lower than the first porosity;
(c) a dielectric layer located on the central portion of the conductive porous base material;
(d) an insulating layer located on the peripheral portion of the conductive porous base material and extending onto an outer peripheral area of the central portion, the insulating layer extending onto the outer peripheral area of the central portion of the conductive porous base material by a covering distance of between 5 µm or more and 50 µm or less; and
(e) an upper electrode located on and in direct contact with the dielectric layer, the conductive porous base material, at least a portion of the dielectric layer the upper electrode cooperating to form an electrostatic capacitive part, wherein the dielectric layer is not located between the peripheral portion of the conductive porous base material and the insulating layer;
wherein a ratio of the covering distance of the insulating layer to a thickness of the central portion of the conductive porous base material is 0.125 or more and 1.25 or less.

14. The capacitor according to claim 13 wherein the dielectric layer and the upper electrode are formed by a gas-phase method.

15. The capacitor according to claim 14, wherein the gas-phase method is an atomic layer deposition method.

16. The capacitor according to claim 13, wherein a thickness of the dielectric layer is 50 nm or less.

17. The capacitor according to claim 13, wherein the upper electrode comprises a metal, a metal nitride, or a metal oxynitride.

18. The capacitor according to claim 13, wherein the insulating layer extends into the outer peripheral area of the central portion by a distance of 2 µm or more and 14 µm or less from an outer peripheral end of the central portion of the conductive porous base material.

19. The capacitor according to claim 13, wherein the central portion has an outward lateral edge and the peripheral portion extends outwardly from the outward lateral edge.

20. The capacitor according to claim 19, wherein the peripheral portion extends around the entire outward lateral edge of the central portion.

21. The capacitor according to claim 20, wherein the central portion has pores and the insulating layer extends into the pores of the central portion which are located adjacent to the peripheral portion.

22. The capacitor according to claim 13, wherein the outer peripheral area of the central portion has pores and the insulating layer extends into the pores of the outer peripheral area of central portion.

23. The capacitor according to claim 13, wherein the dielectric layer extends into pores in the central portion of the conductive porous base material.

24. The capacitor according to claim 13, wherein an outer periphery of the electrostatic capacitive part ends at the insulating layer.

25. The capacitor according to claim 13, wherein the insulating layer extends into pores located in the outer peripheral area of the central portion of the conductive porous base material.

26. A capacitor, comprising:
   (a) a supporting layer;
   (b) a conductive porous base material including a central portion having a first porosity and a peripheral portion having a second porosity which is lower than the first porosity;
   (c) a dielectric layer located on the central portion of the conductive porous base material;
   (d) an insulating layer located on the peripheral portion of the conductive porous base material and extending onto an outer peripheral area of the central portion by a distance of between 5 μm or more and 50 μm or less, wherein a ratio of the distance that the insulating layer extends into the outer peripheral area of the central portion to a thickness of the central portion of the conductive porous base material is 0.125 or more and 1.25 or less; and
   (e) an upper electrode located on and in direct contact with the dielectric layer but not being present between the conductive porous base material and the insulating layer, the conductive porous base material, the dielectric layer and the upper electrode cooperating to form an electrostatic capacitive part.

* * * * *